United States Patent
Lee et al.

(10) Patent No.: US 10,807,634 B2
(45) Date of Patent: Oct. 20, 2020

(54) CONTROL METHOD FOR ELECTRIC POWER STEERING AND CONTROL SYSTEM FOR ELECTRIC POWER STEERING

(71) Applicants: Hyundai Motor Company, Seoul (KR); Kia Motors Corporation, Seoul (KR)

(72) Inventors: Kyung Lae Lee, Shandong (CN); Shen Guo, Shandong (CN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 429 days.

(21) Appl. No.: 15/825,369

(22) Filed: Nov. 29, 2017

(65) Prior Publication Data
US 2019/0144027 A1    May 16, 2019

(30) Foreign Application Priority Data
Nov. 10, 2017    (CN) .......................... 2017 1 1102843

(51) Int. Cl.
*B62D 5/04*      (2006.01)
*B60W 30/045*    (2012.01)
*B62D 15/02*     (2006.01)

(52) U.S. Cl.
CPC ......... *B62D 5/0463* (2013.01); *B60W 30/045* (2013.01); *B62D 5/0472* (2013.01); *B62D 5/0481* (2013.01); *B62D 15/021* (2013.01); *B60Y 2400/304* (2013.01)

(58) Field of Classification Search
CPC .. B62D 5/0463; B62D 5/0472; B62D 5/0481; B62D 15/021; B60W 30/045; B60Y 2400/304
USPC .......................................................... 701/41
See application file for complete search history.

(56) References Cited

U.S. PATENT DOCUMENTS

| | | | | |
|---|---|---|---|---|
| 4,790,404 A | * | 12/1988 | Naito ..................... | B60K 23/04 180/197 |
| 10,005,455 B2 | * | 6/2018 | Hulten; Johan ...... | B60W 10/20 |
| 10,272,943 B2 | * | 4/2019 | Sato .................... | B60W 30/045 |
| 10,689,028 B2 | * | 6/2020 | Jung .................... | B62D 15/021 |
| 2004/0129490 A1 | * | 7/2004 | Kodama ................ | B62D 5/008 180/402 |

(Continued)

FOREIGN PATENT DOCUMENTS

| | | |
|---|---|---|
| CN | 101088830 | 12/2007 |
| CN | 100590018 | 2/2010 |
| JP | 2004017885 A * | 1/2004 |

*Primary Examiner* — Angelina Shudy
(74) *Attorney, Agent, or Firm* — Mintz Levin Cohn Ferris Glovsky and Popeo, P.C.; Peter F. Corless

(57) ABSTRACT

An electric power steering control method includes: measuring an operation state of a vehicle and determining whether the operation state of the vehicle corresponds to a sudden start-up condition; measuring a steering operation state and determining whether the steering operation state corresponds to a torque steer compensation control condition; determining a compensation torque according to a speed difference between left and right front wheels when the sudden start-up condition and the torque steer compensation control condition are satisfied; and outputting a compensation torque signal to an electric power steering according to the determined compensation torque.

11 Claims, 4 Drawing Sheets

(56) References Cited

U.S. PATENT DOCUMENTS

| | | | | |
|---|---|---|---|---|
| 2012/0271516 | A1* | 10/2012 | Takahashi | B62D 5/0466 701/42 |
| 2013/0035831 | A1* | 2/2013 | Nozu | B60K 23/0808 701/69 |
| 2013/0035832 | A1* | 2/2013 | Nozu | B60K 17/35 701/69 |
| 2013/0035833 | A1* | 2/2013 | Nozu | B60K 17/35 701/69 |
| 2014/0336877 | A1* | 11/2014 | Kim | B60W 10/04 701/41 |
| 2015/0025743 | A1* | 1/2015 | Tamura | B62D 6/00 701/41 |
| 2015/0051794 | A1* | 2/2015 | Wei | B62D 15/021 701/41 |
| 2016/0229403 | A1* | 8/2016 | Khafagy | B60W 10/06 |
| 2016/0272197 | A1* | 9/2016 | Hulten | B62D 6/003 |
| 2016/0272211 | A1* | 9/2016 | Igarashi | B60W 30/18145 |
| 2017/0305455 | A1* | 10/2017 | Hisanaga | B62D 5/0493 |
| 2017/0334482 | A1* | 11/2017 | Kojima | G01B 21/22 |
| 2018/0134312 | A1* | 5/2018 | Park | B62D 5/0472 |
| 2018/0281844 | A1* | 10/2018 | Wijffels | B62D 1/181 |
| 2018/0281845 | A1* | 10/2018 | Wijffels | B62D 5/008 |
| 2018/0304919 | A1* | 10/2018 | Jung | B62D 5/0472 |
| 2019/0367079 | A1* | 12/2019 | Kodera | B62D 5/0412 |
| 2020/0080527 | A1* | 3/2020 | Khafagy | F02N 11/0822 |

* cited by examiner

CONTROL METHOD FOR ELECTRIC POWER STEERING AND CONTROL SYSTEM FOR ELECTRIC POWER STEERING

CROSS-REFERENCE TO RELATED APPLICATION

This application claims under 35 U.S.C. § 119(a) the benefit of Chinese Patent Application No. 201711102843.2 filed in the State Intellectual Property Office of the P.R.C on Nov. 10, 2017, the entire contents of which are incorporated herein by reference.

BACKGROUND

(a) Technical Field

The present disclosure relates to an electric power steering control method and an electric power steering control system, more particularly, to an electric power steering control method and system that suppress torque steering.

(b) Description of the Related Art

Torque steering causes engine torque to affect steering, and specifically, torque steering becomes a problem in a front-wheel drive vehicle with a horizontally mounted engine.

For example, torque steering may arise when a vehicle is suddenly accelerated, the vehicle moves to one side so that a driver's view is obstructed, a steering wheel may be pushed, and/or the vehicle may move off its intended path.

The torque steering is directly related to a grip force difference between left and right front wheels, and such a phenomenon becomes especially significant when an excessive amount of torque is transferred to a driving wheel, and the excessive torque is generated from a large gear ratio between an engine and a wheel, torque of the engine itself, or a combination thereof.

In order to suppress torque steering, an auxiliary drive shaft may be applied or a suspension structure may be changed, but such solutions may increase complexity and/or increase cost and weight due to an increased number of parts.

The above information disclosed in this Background section is only for enhancement of understanding of the background of the disclosure and therefore it may contain information that does not form the prior art that is already known in this country to a person of ordinary skill in the art.

SUMMARY

The present disclosure provides an electric power steering control method and an electric power steering control system that can suppress torque steering without requiring additional parts.

An electric power steering control method according to an exemplary embodiment of the present disclosure includes: measuring an operation state of a vehicle and determining whether the operation state of the vehicle corresponds to a sudden start-up condition by a controller; measuring a steering operation state and determining whether the steering operation state corresponds to a torque steer compensation control condition by the controller; determining a compensation torque according to a speed difference between left and right front wheels by the controller when the sudden start-up condition and the torque steer compensation control condition are satisfied; and outputting a compensation torque signal to an electric power steering according to the determined compensation torque by the controller.

The operation state of the vehicle may include an engine torque and a vehicle speed.

When the engine torque exceeds a predetermined reference engine torque and the vehicle speed is slower than a predetermined reference vehicle speed, the sudden start-up condition may be satisfied.

The steering operation state may include a steering angle and a steering torque.

When the steering angle exceeds a first predetermined angle and is less than a second predetermined angle and the steering torque is less than a predetermined steering torque, the torque steer compensation control condition may be satisfied.

The compensation torque signal may be transmitted to the electric power steering to control the vehicle to move in a direction of a wheel having a higher speed among the left and right front wheel.

A maximum value of the compensation torque may be lower than a predetermined compensation torque limit value.

An electric power steering control system according to an exemplary embodiment of the present disclosure compensates torque steering of an electric power steering. The electric power steering control system includes: a vehicle operation state measurer that measures an operation state of a vehicle and outputs a corresponding signal; a steering operation state measurer that measures a steering operation state and outputs a corresponding signal; a first wheel speed sensor and a second wheel speed sensor that measure speed of a left front wheel and a right front wheel and output corresponding signals; and a controller that determines whether a sudden start-up condition and a torque steer compensation control condition are satisfied according to output signals of the vehicle operation state measurer and the steering operation state measurer, determines a compensation torque according to output signals of the first and second wheel speed sensors when sudden start-up condition and the torque steer compensation control condition are satisfied, and transmits the compensation torque to the electric power steering.

The vehicle operation state measurer may include an engine torque sensor and a vehicle speed sensor.

The controller may determine that the sudden start-up condition is satisfied when an output signal of the engine torque sensor exceeds a predetermined reference engine torque and an output signal of the vehicle speed sensor indicates that vehicle speed is slower than predetermined vehicle speed.

The steering operation state measurer may include a steering angle sensor and a steering torque sensor.

The controller may determine that the torque steer compensation control condition is satisfied when an output signal of the steering sensor exceeds a first predetermined angle and is less than a second predetermined angle and an output signal of the steering torque sensor is less than a predetermined steering torque.

The controller may output a compensation torque signal to the electric power steering to control a vehicle to move in a direction of a wheel having a higher speed among left and right front wheels according to the output signals of the first and second wheel speed sensors.

A maximum value of the compensation torque may be less than a predetermined compensation torque limit value.

According to the electric power steering control method and the electric power steering control system of the exemplary embodiments of the present disclosure, torque steering can be suppressed without changing a structure or adding parts.

A non-transitory computer readable medium containing program instructions executed by a processor, according to an exemplary embodiment of the present disclosure, may include: program instructions that measure an operation state of a vehicle and determine whether the operation state of the vehicle corresponds to a sudden start-up condition; program instructions that measure a steering operation state and determine whether the steering operation state corresponds to a torque steer compensation control condition; program instructions that determine a compensation torque according to a speed difference between left and right front wheels when the sudden start-up condition and the torque steer compensation control condition are satisfied; and program instructions that output a compensation torque signal to an electric power steering according to the determined compensation torque.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
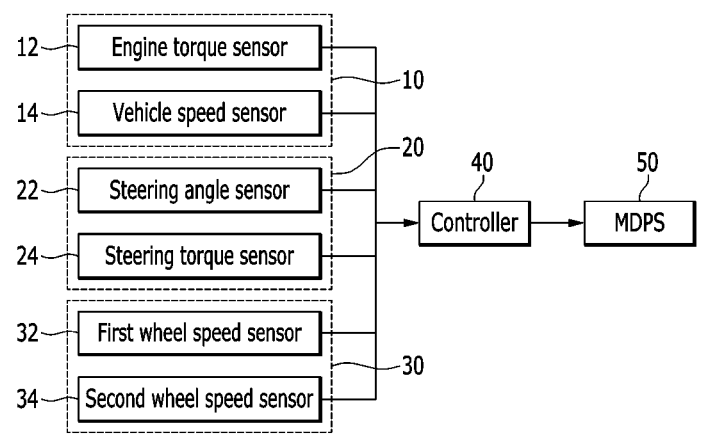
FIG. 1 is a block diagram of an electric power steering control system according to an exemplary embodiment of the present disclosure.

An exemplary embodiment of the present disclosure will hereinafter be described in detail with reference to the accompanying drawings. FIG. 1 is a block diagram of an electric power steering control system according to an exemplary embodiment of the present disclosure.

Referring to FIG. 1, an electric power steering control system according to an exemplary embodiment of the present disclosure includes a vehicle operation state measurer 10 that measures a vehicle operation state and outputs a corresponding signal, a steering operation state measurer 20 that measures a steering operation state and outputs a corresponding signal, a wheel speed sensor 30, and a controller 40 that controls an electric power steering 50 by receiving output signals of the steering operation state measurer 20 and the wheel speed sensor 30.

The electric power steering 50 may be provided as various types of devices that can be controlled and operated by an electric signal and power, and for example, may be provided as motor driven power steering (MDPS).

The controller 40 may be implemented as one or more microprocessors operating by a predetermined program, and the predetermined program may include a series of commands for performing a method according to the exemplary embodiment of the present disclosure.

The controller 40 is provided as a single component, but this is not restrictive. The controller 40 may be formed of one or a plurality of physical or electric configurations.

The vehicle operation state measurer 10 includes an engine torque sensor 12 that measures an engine torque and outputs a corresponding signal and a vehicle speed sensor 14 that measures a vehicle speed and outputs a corresponding signal.

The steering operation state measurer 20 includes a steering angle sensor 22 that measures a steering angle of a handle and outputs a corresponding signal and a steering torque sensor 24 that measures steering torque of the handle and outputs a corresponding signal.

The wheel speed sensor 30 includes a first wheel speed sensor 32 and a second wheel speed sensor 34 that measure speed of each of left and right front wheels and output corresponding signals.

Figure 4:
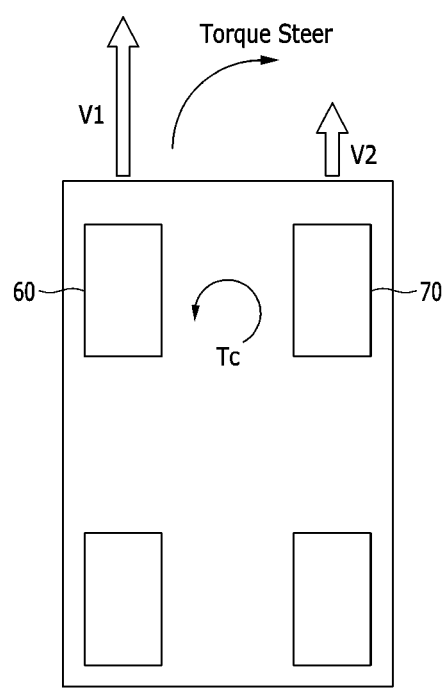
FIG. 4 shows an operation of the electric power steering control system according to the exemplary embodiment of the present disclosure.

The electric power steering control system according to the exemplary embodiment of the present disclosure is provided to suppress torque steering of a front-wheel-driving vehicle, and the first and second wheel speed sensors 32 and 34 respectively measure rotation speed of a left front wheel 60 and a right front wheel 70 shown in FIG. 4 and output corresponding signals.

Figure 2:
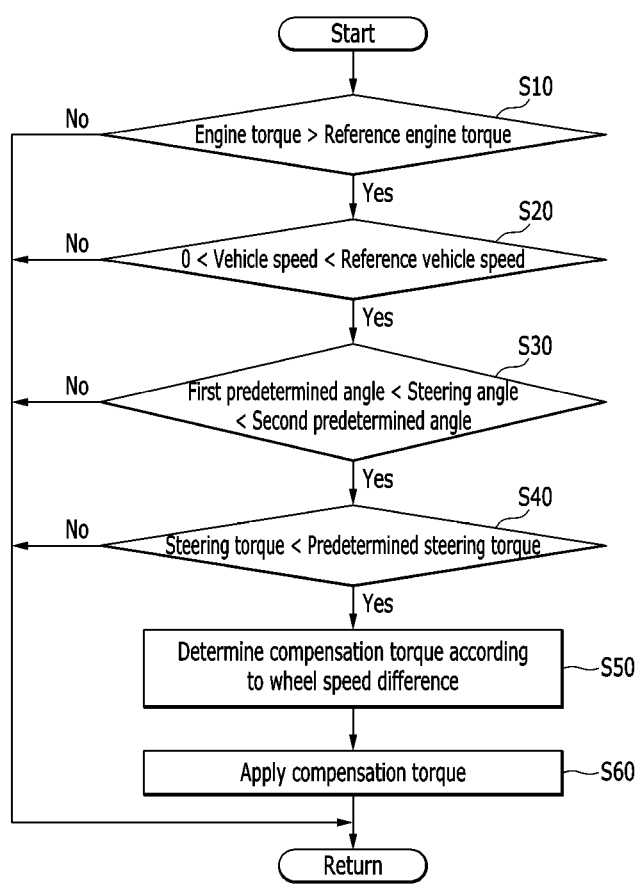
FIG. 2 is a flowchart of an electric power steering control method according to an exemplary embodiment of the present disclosure.
Figure 3:
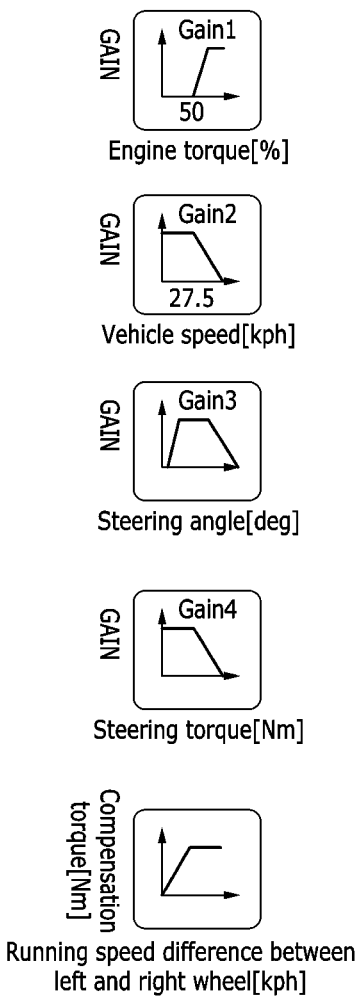
FIG. 3 shows an operation mechanism of the electric power steering control method according to the exemplary embodiment of the present disclosure.

FIG. 2 is a flowchart of an electric power steering control method according to the exemplary embodiment of the present disclosure, and FIG. 3 shows an operation mechanism of the electric power steering control method according to the exemplary embodiment of the present disclosure.

Hereinafter, the electric power steering control method according to the exemplary embodiment of the present disclosure will be described with reference to FIGS. 1-3.

The controller 40 determines whether the output signals of the vehicle operation state measurer 10 and the steering operation state measurer 20 correspond to a sudden acceleration condition and a torque steer compensation control condition (S10, S20, S30, and S40), and when the output signals correspond to the sudden acceleration condition and the torque steer compensation control condition, the controller 40 determines compensation torque according to output signals of the first and second wheel speed sensors 32 and 34 (S50) and applies the compensation torque to the electric power steering 50 (S60).

The controller 40 determines whether an output signal of the engine torque sensor 12 exceeds a predetermined reference engine torque (S10).

The torque steering is generally generated when sudden start-up occurs, and since the engine torque is rapidly increased at the time of sudden start-up, whether or not sudden start-up is occurred can be determined with reference to the engine torque.

As shown in FIG. 3, when the engine torque is about 50% or higher, it can be determined that the sudden start-up has occurred, but this is not restrictive. A reference engine torque may be variously set depending on a type of vehicle.

The controller 40 determines whether or not a vehicle speed is slower than a predetermined reference vehicle speed based on an output signal of the vehicle speed sensor 14 (S20).

The reference vehicle speed is provided for determining whether or not a vehicle is started, and in a general driving condition, since a dangerous situation may occur when the compensation torque is applied, the compensation torque is limited to be applied only in a situation where the vehicle speed is low.

In FIG. 3, the vehicle speed is 0-27.5 km/h, but this is not restrictive. A reference vehicle speed may be changed depending on a type of vehicle.

The controller 40 determines that the sudden start-up condition is satisfied when the output signal of the engine torque sensor 12 exceeds a predetermined reference engine torque and the output signal of the vehicle speed sensor 14 is less than the predetermined reference vehicle speed.

The controller 40 determines whether an output signal of the steering angle sensor 22 exceeds a first predetermined angle and is less than a second predetermined angle (S30).

When the torque steer occurs, the steering angle is relatively small in general, and when a driver wants to steer, a steering angle limitation is set to limit artificial compensation torque application.

For example, when the first predetermined angle and the second predetermined angle are respectively set to 0.1 degrees and 10 degrees, which are relatively small reference steering angles, but this is not restrictive. The reference steering angle may vary depending on a type of vehicle.

The controller 40 determines whether the output signal of the steering torque sensor 24 is less than a predetermined steering torque (S40).

When the torque steer occurs, a steering torque is relatively small in general, and when a driver wants to steer, a steering torque limitation is set to limit artificial compensation torque application.

A predetermined steering torque may be set to about 0.4 to 1 Nm, which is a relatively small steering torque, but this is not restrictive. A reference steering torque may vary depending on a type of vehicle.

The controller 40 determines that the torque steer compensation control condition is satisfied when the steering angle exceeds the first predetermined angle and is less than the second predetermined angle and when the steering torque is less than the predetermined steering torque.

The controller 40 determines a compensation torque depending on output signals of the first and second wheel speed sensors 32 and 34 (S50).

When there is no speed difference between the left wheel and the right wheel, the compensation torque becomes zero, and when a speed difference occurs between the left and right wheels, the compensation torque may be set as a value that is proportional to the wheel speed difference. However, this is not restrictive, and a compensation torque may vary depending on a type of vehicle.

The maximum value of the compensation torque may be smaller than a predetermined compensation torque limit value. An excessive wheel speed difference between the left and right wheel may due to a vehicle problem rather than due to a normal torque steer phenomenon, and thus the maximum value of the compensation torque is limited because an excessive compensation torque may interrupt safe driving.

For example, the compensation torque limit value is set to about 7 to 8 Nm so as not to interfere with safe driving. However, this is not restrictive, and a compensation torque limit value may vary depending on a type of vehicle.

FIG. 4 shows an operation of an electric power steering control system according to the exemplary embodiment of the present disclosure.

The controller 40 may output a compensation torque signal to the electric power steering 50 in order to control a vehicle to move in a direction of a wheel having faster speed among the left and right front wheels 60 and 70 according to the output signals of the first and second wheel speed sensors 32 and 34.

Torque steering occurs as a phenomenon in which the vehicle moves in a direction of a wheel having a slower speed among the left and right wheels due to a wheel speed difference between the left and right wheels.

For example, as shown in FIG. 4, when the left wheel 60 is faster than the right wheel 70, the vehicle tends to rotate in a clockwise direction. In this case, the controller 40 outputs a control signal to the electric power steering 50 to control the compensation torque Tc to be generated in a counterclockwise direction.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:
1. An electric power steering control method, comprising:
measuring, by a controller, an operation state of a vehicle and determining whether the operation state of the vehicle corresponds to a sudden start-up condition;

measuring, by the controller, a steering operation state and determining whether the steering operation state corresponds to a torque steer compensation control condition;

determining, by the controller, a compensation torque according to a speed difference between left and right front wheels when the sudden start-up condition and the torque steer compensation control condition are satisfied; and outputting, by the controller, a compensation torque signal to an electric power steering according to the determined compensation torque, wherein the steering operation state comprises a steering angle and a steering torque, and wherein when the steering angle exceeds a first predetermined angle and is less than a second predetermined angle and the steering torque is less than a predetermined steering torque, the torque steer compensation control condition is satisfied.

2. The electric power steering control method of claim 1, wherein the operation state of the vehicle comprises an engine torque and a vehicle speed.

3. The electric power steering control method of claim 2, wherein when the engine torque exceeds a predetermined reference engine torque and the vehicle speed is slower than a predetermined reference vehicle speed, the sudden start-up condition is satisfied.

4. The electric power steering control method of claim 1, wherein the compensation torque signal is transmitted to the electric power steering to control the vehicle to move in a direction of a wheel having a higher speed among the left and right front wheel.

5. The electric power steering control method of claim 4, wherein a maximum value of the compensation torque is lower than a predetermined compensation torque limit value.

6. An electric power steering control system that compensates a torque steer of an electric power steering, comprising:
    a vehicle operation state measurer that measures an operation state of a vehicle and outputs a corresponding signal;
    a steering operation state measurer that measures a steering operation state and outputs a corresponding signal;
    a first wheel speed sensor and a second wheel speed sensor that measure speed of a left front wheel and a right front wheel and output corresponding signals; and
    a controller that determines whether a sudden start-up condition and a torque steer compensation control condition are satisfied according to output signals of the vehicle operation state measurer and the steering operation state measurer, determines a compensation torque according to output signals of the first and second wheel speed sensors when the sudden start-up condition and the torque steer compensation control condition are satisfied, and transmits the compensation torque to the electric power steering, wherein the steering operation state measurer comprises a steering angle sensor and a steering torque sensor, and wherein the controller determines that the torque steer compensation control condition is satisfied when an output signal of the steering sensor exceeds a first predetermined angle and is less than a second predetermined angle and an output signal of the steering torque sensor is less than a predetermined steering torque.

7. The electric power steering control system of claim 6, wherein the vehicle operation state measurer comprises an engine torque sensor and a vehicle speed sensor.

8. The electric power steering control system of claim 7, wherein the controller determines that the sudden start-up condition is satisfied when an output signal of the engine torque sensor exceeds a predetermined reference engine torque and an output signal of the vehicle speed sensor indicates that vehicle speed is slower than predetermined vehicle speed.

9. The electric power steering control system of claim 6, wherein the controller outputs a compensation torque signal to the electric power steering to control a vehicle to move in a direction of a wheel having a higher speed among left and right front wheels according to the output signals of the first and second wheel speed sensors.

10. The electric power steering control system of claim 9, wherein a maximum value of the compensation torque is less than a predetermined compensation torque limit value.

11. A non-transitory computer readable medium containing program instructions executed by a processor, the computer readable medium comprising:
    program instructions that measure an operation state of a vehicle and determine whether the operation state of the vehicle corresponds to a sudden start-up condition;
    program instructions that measure a steering operation state and determine whether the steering operation state corresponds to a torque steer compensation control condition;
    program instructions that determine a compensation torque according to a speed difference between left and right front wheels when the sudden start-up condition and the torque steer compensation control condition are satisfied; and
    program instructions that output a compensation torque signal to an electric power steering according to the determined compensation torque, wherein the steering operation state comprises a steering angle and a steering torque, and wherein when the steering angle exceeds a first predetermined angle and is less than a second predetermined angle and the steering torque is less than a predetermined steering torque, the torque steer compensation control condition is satisfied.

* * * * *